United States Patent [19]

Haustein

[11] Patent Number: 5,297,844
[45] Date of Patent: Mar. 29, 1994

[54] REMOVABLE CAB AND STAND FOR ALL TERRAIN VEHICLES

[76] Inventor: Herbert H. Haustein, 5712 Camp Robinson Rd., N. Little Rock, Ark. 72118

[21] Appl. No.: 85,825

[22] Filed: Jul. 2, 1993

[51] Int. Cl.⁵ .............................................. B62D 33/06
[52] U.S. Cl. .................................... 296/190; 182/116; 182/127; 43/1; 296/35.3
[58] Field of Search ................ 296/190, 35.3; 182/116, 182/127; 43/1

[56] References Cited

U.S. PATENT DOCUMENTS

| | | | |
|---|---|---|---|
| 757,749 | 4/1904 | Hughes | 296/82 |
| 2,854,705 | 10/1958 | McClaran | 43/55 |
| 3,406,784 | 10/1968 | Jones et al. | 182/97 |
| 3,642,318 | 2/1972 | Avant | 297/184 |
| 4,412,398 | 11/1983 | Harmon | 43/1 |
| 4,606,142 | 8/1986 | Reneau | 43/1 |
| 4,614,252 | 9/1986 | Tarner | 182/116 |
| 4,625,831 | 12/1986 | Rodgers, Jr. | 182/116 |
| 4,696,374 | 9/1987 | Hale | 182/127 |
| 4,719,716 | 1/1988 | Chrisley | 43/1 |
| 4,787,477 | 11/1988 | Dolan | 182/116 |
| 4,800,986 | 1/1989 | Hayes, III | 182/18 |
| 5,042,614 | 8/1991 | Rainey | 182/22 |
| 5,102,179 | 4/1992 | Royer | 296/26 |
| 5,105,908 | 4/1992 | Freund | 182/20 |

Primary Examiner—Robert R. Song
Attorney, Agent, or Firm—Richard C. Litman

[57] ABSTRACT

A cab and observation or hunting stand is temporarily attachable to and quickly and easily removable from the front and rear racks of an ATV. The cab may be enclosed for weather protection if desired; at least one openable window and latchable door are provided. The cab may include a foldable stand on top, for use as an observation and/or hunting stand. Seating is provided in the stand, along with provision for a removable shade. Stabilization for the stand is provided by at least one stabilizer bar and an access ladder for the stand, which also serves as an additional stabilizing device. The apparatus may be camouflaged if desired, and lighting may be included within the cab for low light level operations.

16 Claims, 11 Drawing Sheets

REMOVABLE CAB AND STAND FOR ALL TERRAIN VEHICLES

FIELD OF THE INVENTION

The present invention relates generally to removable accessory structures for motorized land vehicles, and more specifically to a cab structure and folding stand thereon which is temporarily installable upon and removable from an all terrain vehicle. The device is of particular value for hunting.

BACKGROUND OF THE INVENTION

The development of relatively small and lightweight internal combustion engines and transmission systems, has led to the development of correspondingly small and lightweight motorized four wheel vehicles intended primarily for off road use. While the initial intent of such vehicles was for recreational travel in unimproved areas (e.g., "dune buggy" type operations), hunters quickly became aware of the utility of such all terrain vehicles (hereinafter known as "ATVs") to travel into remote and roadless areas where there was a greater likelihood of finding game. The use of ATVs for hunting has greatly lessened the chore of removal of game from such remote sites also.

However, a standard ATV provides nothing more than a motorized means of traveling to and from a remote site, and perhaps a means of carrying any game back out from such a site. Hunters have also learned of the advantages of elevated hunting sites, both to remove themselves from the horizontal field of view of the game, and further to provide a greater field of view and field of fire from such an elevated site. A conventional ATV is incapable of providing such elevational advantages. While various stands and the like have been developed for installation upon ATVs, most are permanent installations which render the ATV relatively useless for other operations, and/or fail to provide all of the versatility required of such a device.

The need arises for a temporarily installable and removable cab and stand structure for an ATV, which structure provides for the removal and/or folding of the stand components atop the cab. Additional refinements, such as a cab enclosure permitting a good view for the occupant(s) of the cab; camouflage means making detection by game more difficult; and additional features, such as interior lighting for low light conditions, should be provided in addition to the basic structure.

DESCRIPTION OF THE PRIOR ART

U.S. Pat. No. 757,749 issued to George A. Hughes on Apr. 19, 1904 discloses a Storm Apron providing frontal cover for the occupants of a carriage or buggy. Only partial cover is provided, as the existing top provides for the balance of the required cover, and no elevated structure is disclosed.

U.S. Pat. No. 2,854,705 issued to Johnson C. McClaran on Oct. 7, 1958 discloses a Portable Hunting Blind which may be carried atop an automobile in its disassembled state. However, the device must be erected on the ground; no means is provided for erection of the device upon a motor vehicle.

U.S. Pat. No. 3,406,784 issued to Glendale Jones et al. on Oct. 22, 1968 discloses a Portable Hunting Blind specifically adapted for carriage on the back of a pickup truck. The entire device remains assembled, and arcuately swings upward from attach points in the bed side walls to secure over the cab of the pickup. No means for folding any of the structure upon itself for more compact carriage is disclosed.

U.S. Pat. No. 3,642,318 issued to Ralph L. Avant on Feb. 15, 1973 discloses a Hunter's Blind which is formed of a collapsible, hinged structure. However, no means for attachment to an ATV or for providing an elevated stand is disclosed.

U.S. Pat. No. 4,412,398 issued to Alvin E. Harmon on Nov. 1, 1983 discloses a Hunting Stand providing an elevated position for the hunter. However, the stand disassembles rather than folding, and no means is provided for attachment to or carriage by a vehicle.

U.S. Pat. No. 4,606,142 issued to Charles F. Reneau on Aug. 19, 1986 discloses an Elevated Game Blind. The same points apply here as to the Harmon patent discussed immediately above.

U.S. Pat. No. 4,614,252 issued to David E. Tarner on Sep. 30, 1986 discloses a Portable Observation Structure which is attachable to an ATV, basically comprising a foldable ladder extending upward from the rear rack of the vehicle. No cab means or camouflage is provided.

U.S. Pat. No. 4,625,831 issued to Harvey B. Rodgers, Jr. on Dec. 2, 1986 discloses a Deer Stand attachable to the rear rack of an ATV and foldable thereon. The height is limited by the compact folded size, no cab is provided, and moreover the device must use a tree or other vertical object as a support.

U.S. Pat. No. 4,696,374 issued to John E. Hale on Sep. 29, 1987 discloses an ATV Hunting Stand attachable to the rear rack, generally in the manner of those devices discussed above. The elevation thus provided is limited in comparison to the present invention, and no cab means or enclosure is provided.

U.S. Pat. No. 4,719,716 issued to Tom H. Chrisley, Jr. on Jan. 19, 1988 discloses a Round Deer Stand comprising an elevatable enclosure mounted on a trailer. No attachment to a motorized vehicle is disclosed, nor is any cab means for such a vehicle.

U.S. Pat. No. 4,787,477 issued to Rex H. Dolan on Nov. 29, 1988 discloses a Stand For All Terrain Vehicle comprising a foldable tower having a seat thereon. No cab means or camouflage is disclosed.

U.S. Pat. No. 4,800,986 issued to James C. Hayes on Jan. 31, 1989 discloses a Collapsible Tower For ATVs which secures to the forward and rear racks. While the device spans the seat(s) of the ATV, no cab enclosure is provided, nor is any camouflage means provided.

U.S. Pat. No. 5,042,614 issued to Robert P. Rainey on Aug. 27, 1991 discloses an Adaptable Hunting Stand For Ladder-Like Use Or A-Frame Use. The device has the same limitations as those of the Hayes device discussed immediately above.

U.S. Pat. No. 5,102,179 issued to Jerry L. Royer on Apr. 7, 1992 discloses a Hunter's Blind including elevating means operable from within the blind. The device is foldable and forms its own trailer for transport when collapsed. However, no means for carriage directly on an ATV is disclosed.

Finally, U.S. Pat. No. 5,105,908 issued to Harvey J. Freund on Apr. 21, 1992 discloses a Ladder Treestand And Trailer Rit (sic). The device must be used in combination with a tree or other elevated structure; no cab means for an ATV is provided. Transport is by means of a trailer.

None of the above noted patents, taken either singly or in combination, are seen to disclose the specific arrangement of concepts disclosed by the present invention.

SUMMARY OF THE INVENTION

By the present invention, an improved cab structure installable on ATVs is disclosed.

Accordingly, one of the objects of the present invention is to provide an improved ATV cab structure which is temporarily installable on and easily removable from an ATV.

Another of the objects of the present invention is to provide an improved ATV cab structure which includes an observation or hunting stand mounted thereabove.

Yet another of the objects of the present invention is to provide an improved ATV cab structure which provides for the foldable portability of such a stand mounted thereon, along with any seating and other additions thereon.

Still another of the objects of the present invention is to provide an improved ATV cab structure which may include camouflage means thereon to provide at least partial concealment from game.

A further object of the present invention is to provide an improved ATV cab structure which may include enclosure means for weather protection, and which also provides full visibility from within the cab.

An additional object of the present invention is to provide an improved ATV cab structure which may include lighting means within the cab for use in low light level conditions.

Another object of the present invention is to provide an improved ATV cab structure which may include door and latch means and an openable window for the enclosed cab structure.

Yet another object of the present invention is to provide an improved ATV cab structure which includes stabilizing means for a stand atop the cab structure, when the stand is erected, with the stabilizing means at least partially comprising a ladder providing access to the stand.

Still another object of the present invention is to provide an improved ATV cab structure which may include removable shelter means for a stand mounted atop the cab structure.

A final object of the present invention is to provide an improved ATV cab structure for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
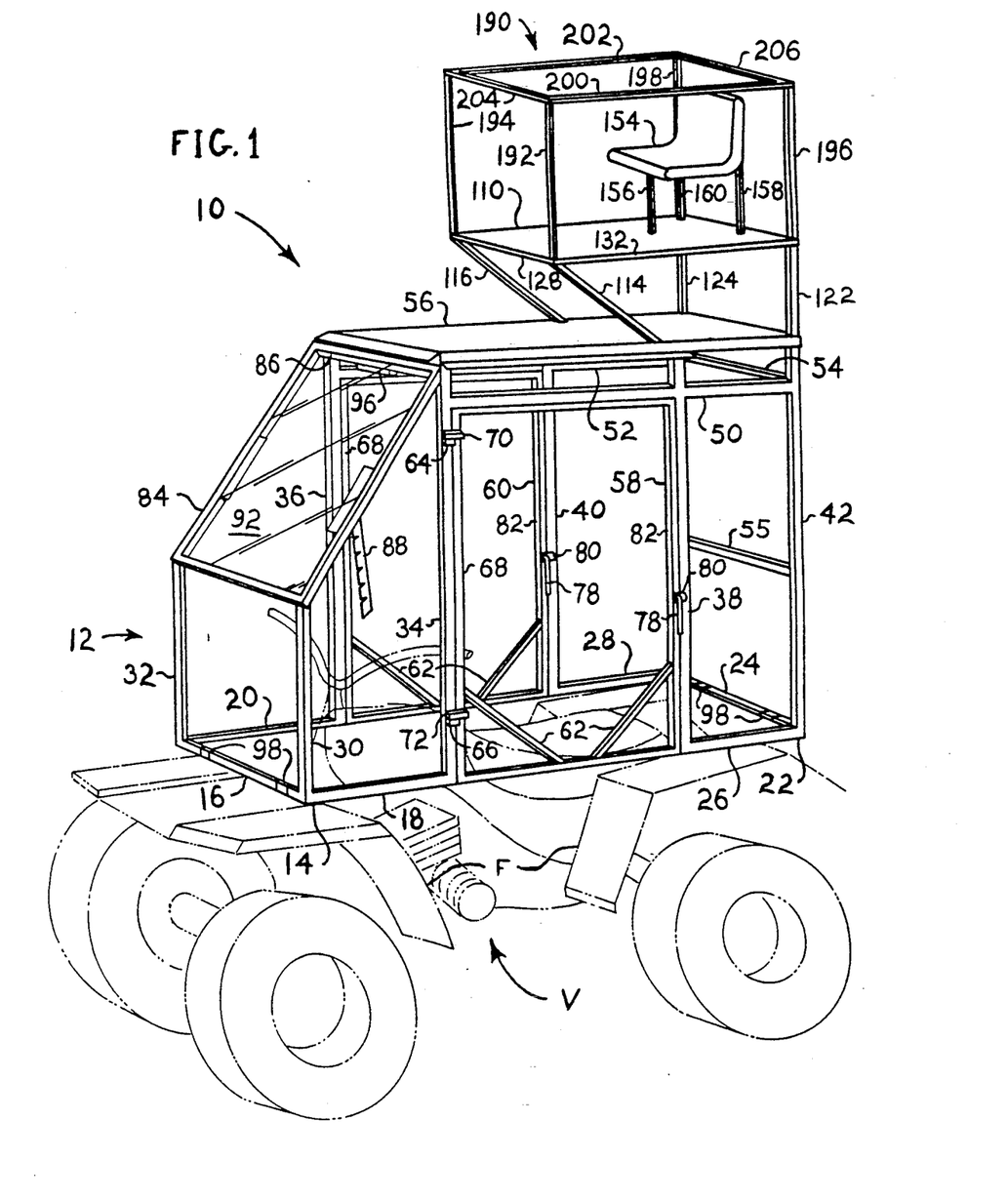
FIG. 1 is a perspective view of the cab and stand of the present invention installed upon an ATV, with the upper portion of the stand erected.

Referring now particularly to FIG. 1 of the drawings, the present invention will be seen to relate to a temporarily installable and removable cab and upper stand structure 10 for temporary installation on an ATV, generally shown in broken lines and designated as V throughout the drawing figures. The lower cab portion 12 is preferably formed of welded square or rectangular section steel tube for strength and relatively good strength to weight ratio (although other materials and assembly means may be used), and includes a forward base 14 formed of a forward crossmember 16 and left and right forward side members 18 and 20, and a rear base 22 formed of a rear crossmember 24 and left and right rear side members 26 and 28. Left and right front uprights 30 and 32 and left and right forward door frame uprights 34 and 36 extend upward from the respective corners of the forward base 14, while left and right rear door frame uprights 38 and 40 and left and right rear uprights 42 and 44 (shown in FIGS. 4 and 7) extend upward from the respective corners of the rear base 22.

Figure 6:
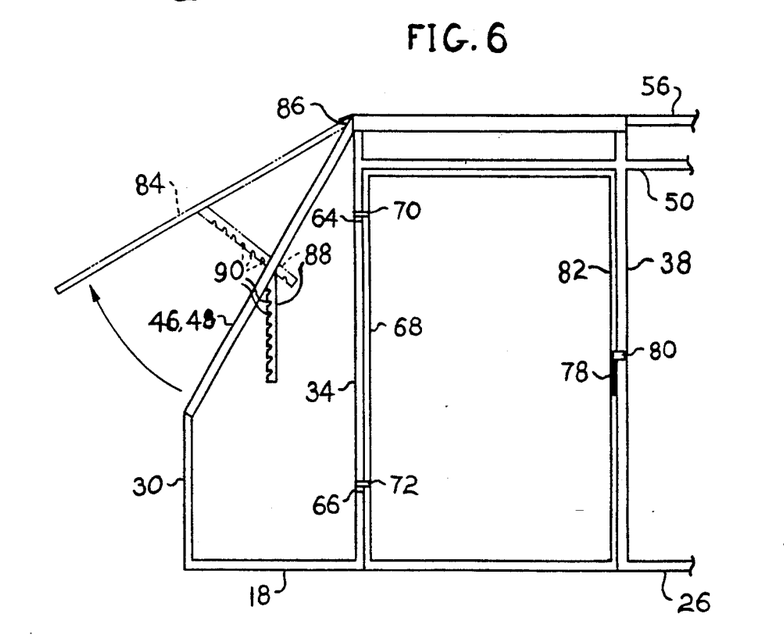
FIG. 6 is a broken side view showing the cab door and also the front windshield opening and latch.

The front uprights 30 and 32 are topped by a windshield base crossmember (not shown; concealed behind the lower edge of the windshield) which ties to the upper ends of the left and right forward door frame uprights 34 and 36 by means of upwardly and rearwardly extending left and right windshield side frame members 46 and 48 (FIG. 6). Additional strength and rigidity is provided by upper left and right side crossmembers 50 and 52, and upper and medial rear crossmembers 54 and 55. The cab portion 12 is topped by a cab top platform or roof 56, which cab top platform or roof serves as a base for further overlying structure to be described further below.

It will be noted that the forward and rearward base components 14 and 22 do not provide a continuous structure from the front to the rear of the lower cab portion 12, but include a central gap or opening in each side. This gap provides for ease of ingress and egress from the ATV V when the cab and stand structure is installed thereon. For better weather protection, left and right doors 58 and 60 may be installed in the respective openings or gaps defined by the left front door frame upright 34, left rear door frame upright 38, and upper left side member 50, and the right front door frame upright 36, right rear door frame upright 40, and upper right side member 52. Additional diagonals or gussets 62 may be installed at the lower corners of the doors as shown, and/or alternatively at the upper corners, for additional door strength. Each door 58 and 60 is preferably constructed in the same manner as the lower cab portion 12 of the present invention described above, and is quickly and easily installable and removable.

Figure 3:
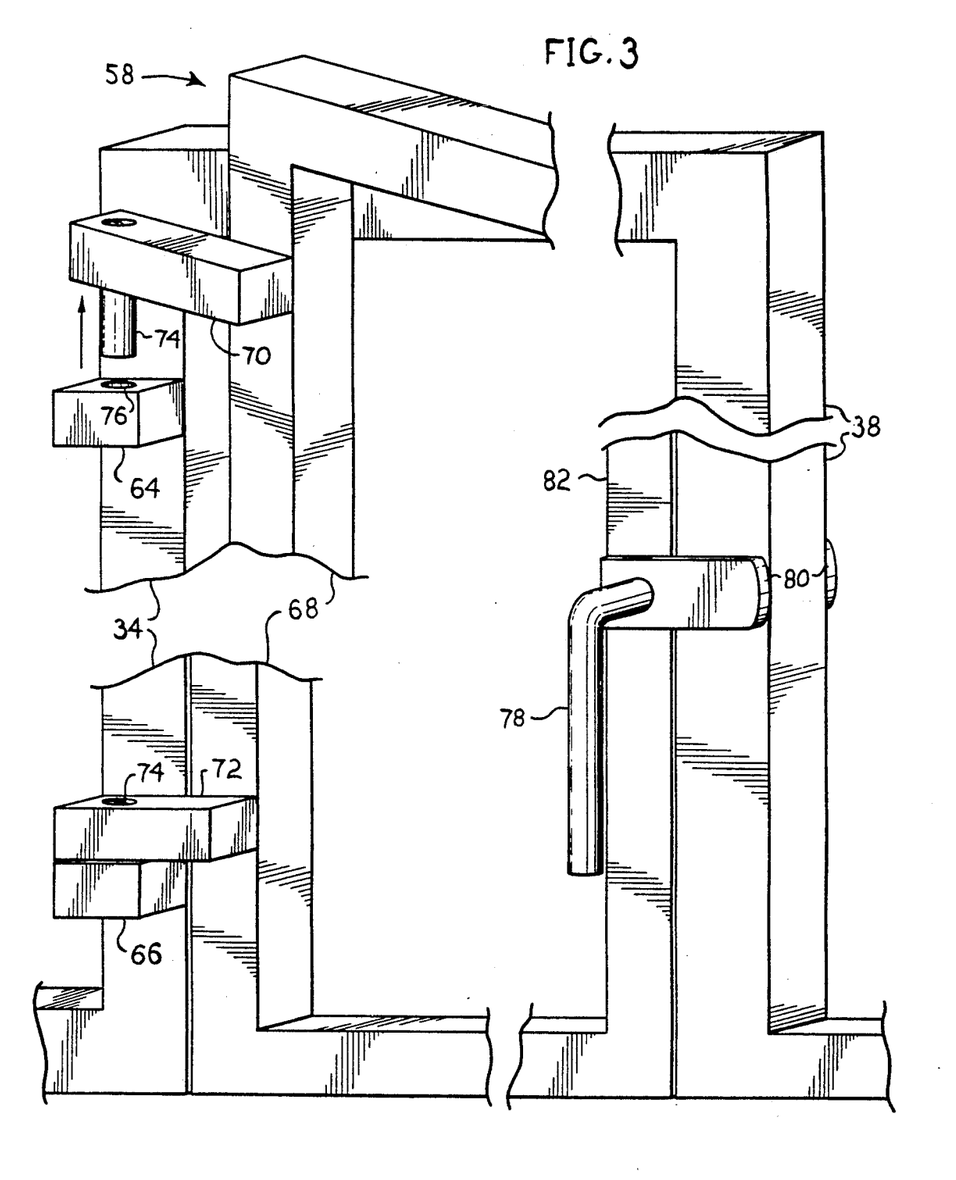
FIG. 3 is a broken perspective view showing the cab door hinge and latch details.

The details providing for door installation and removal, as well as the latch means, are shown in FIG. 3. FIG. 3 is a simplified broken detail view of the left door 58 and associated frame components 34 and 38; it will be understood that the right door 60 is a mirror image of the left door 58. Upper and lower hinge supports 64 and 66 are installed (e.g., welded) to the outer surface of the forward door frame upright 34, while the forward door edge 68 of the door 58 includes mating upper and lower hinge blocks 70 and 72 extending from the outer surface thereof. Hinge blocks 70 and 72 each include a substantially vertical pin 74, which engages with a hole 76 in the corresponding hinge support 64 and 66. A latch mechanism, comprising a pivotable handle 78 and opposed latch tabs 80 secured thereto, is provided on the opposite or rear edge 82 of the door 58. The handle 78 passes through the rear door edge 82, and includes an angled extension providing leverage for latch actuation. The two tabs 80 of each latch are spaced apart to sandwich the rear door frame uprights 38 (for the left door 58) and 40 (for the right door 60) when the doors are closed. When the handle 78 is rotated, the spaced apart latch tabs 80 are also rotated about the axis provided by the passage through the rear door edge member 82, to clear the rear door frame upright 38 or 40 and allow the respective door 58 and/or 60 to be swung open. If desired, the door(s) 58 and 60 may then be removed, as they will be clear of the overlying side members 50 and 52 in their open condition and may be lifted substantially vertically to remove the pins 74 from their respective door hinge supports 64 and 66. Reversal of the above operation provides for easy installation of the doors 58 and 60 to the cab 12 structure.

Figure 11:
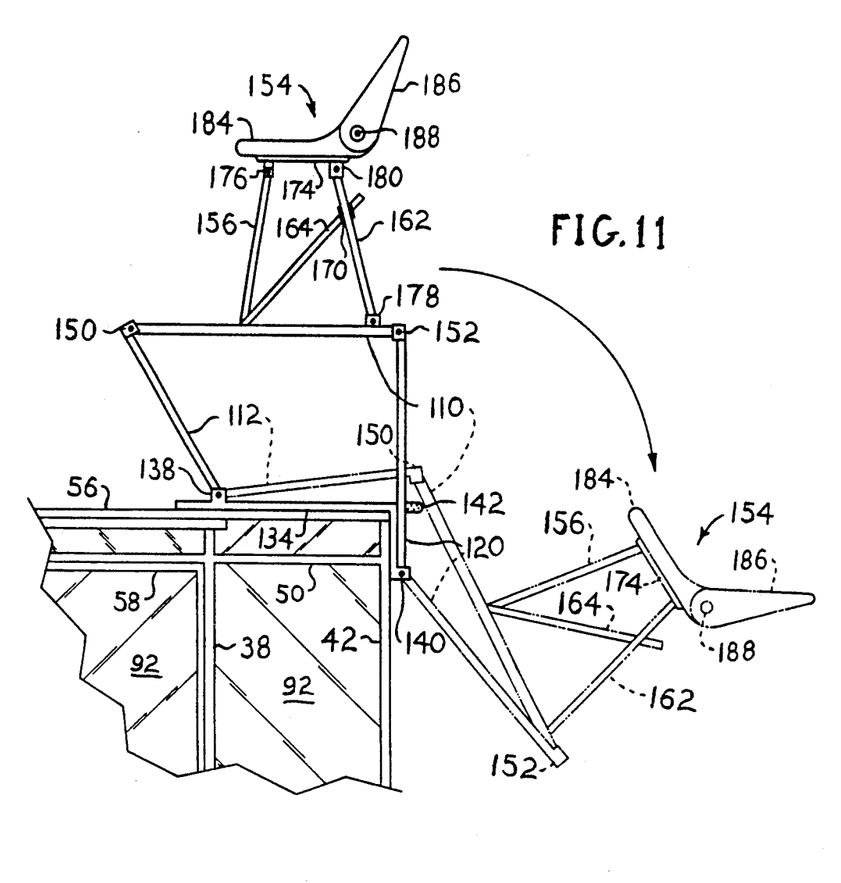
FIG. 11 is a broken side view of the upper rear portion of the cab and stand, showing the folding of the stand against the back of the cab.
Figure 12:
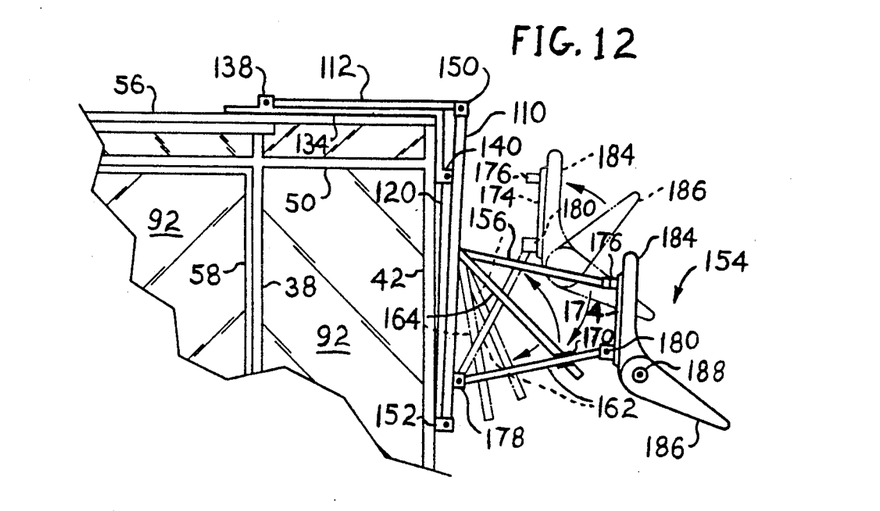
FIG. 12 is a broken side view of the upper rear portion of the cab with the stand folded against the back of the cab, and showing the folding of the seat support and seat.
Figure 13:
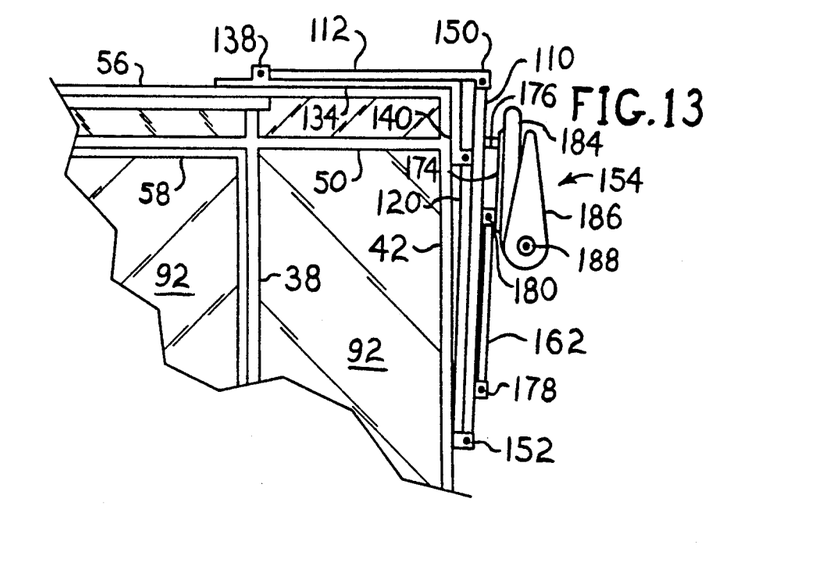
FIG. 13 is broken side view of the upper rear portion of the cab, showing the stand, seat and seat support folded against the back of the cab.
Figure 14:
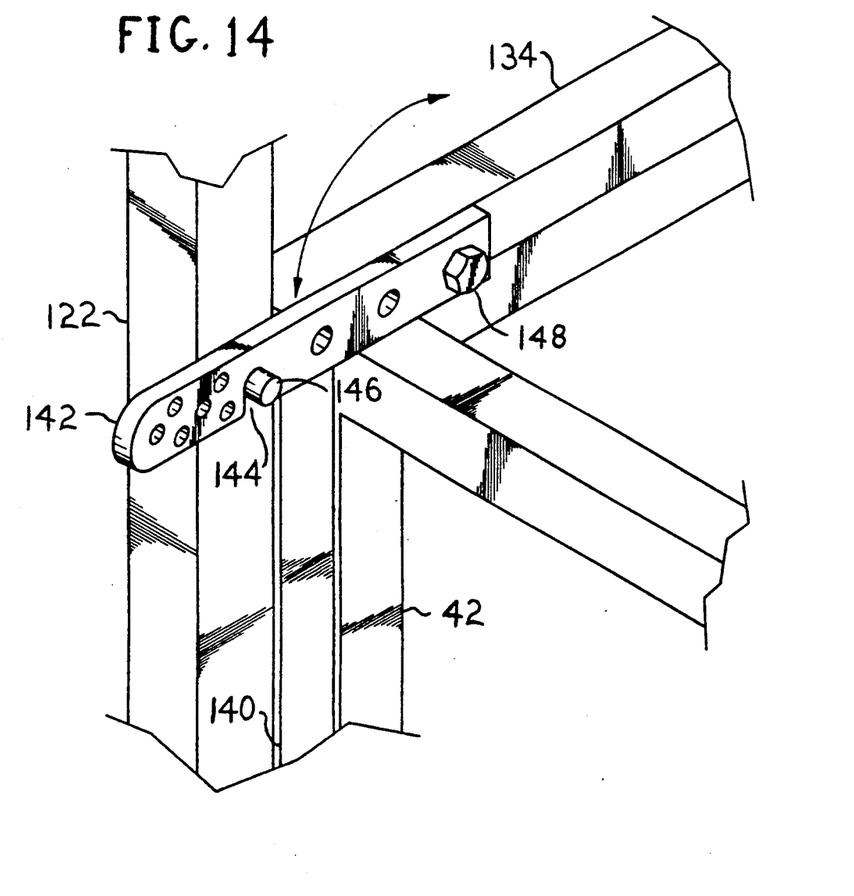
FIG. 14 is a broken perspective view of the latching mechanism detail for the upper stand.

The cab 12 includes another movable panel: A pivotally openable windshield 84 is provided at the front of the cab 12. The windshield 84 is hinged at its upper edge 86, and may be swung open forwardly from the supporting cab frame members 46 and 48 as shown in FIG. 6 to provide better ventilation if desired. Slotted windshield latches 88 are provided, which slots 90 engage pins (not shown) in the inner sides of the adjacent cab frame members 46 and 48 to hold the windshield 84 open as desired. The windshield may be covered with a transparent sheet material 92, e.g., an acrylic plastic such as Plexiglass (TM), or other transparent material for good visibility. In fact, the remainder of the cab 12 structure may also be covered in like transparent sheet material 92 if desired, as shown in FIGS. 11 through 13, to provide an enclosed cab structure. Additional weather protection may be provided by means of skirts (not shown) formed of a flexible sheet material, secured to the front and rear side members 18 and 26 (left side) and 20 and 28 (right side) to provide closure for the space between the sides of the forward and rear bases 14 and 22 and the front and rear fenders F and floor of the ATV V. The skirts or flaps may be attached by means of snaps, ties, hook and loop material, etc. to provide greater protection from the elements, if desired. Ingress and egress from the cab 12 interior is still provided through the doors 58 and 60, by merely stepping over the skirt extending along the bottom edge of the cab 12.

Figure 2:
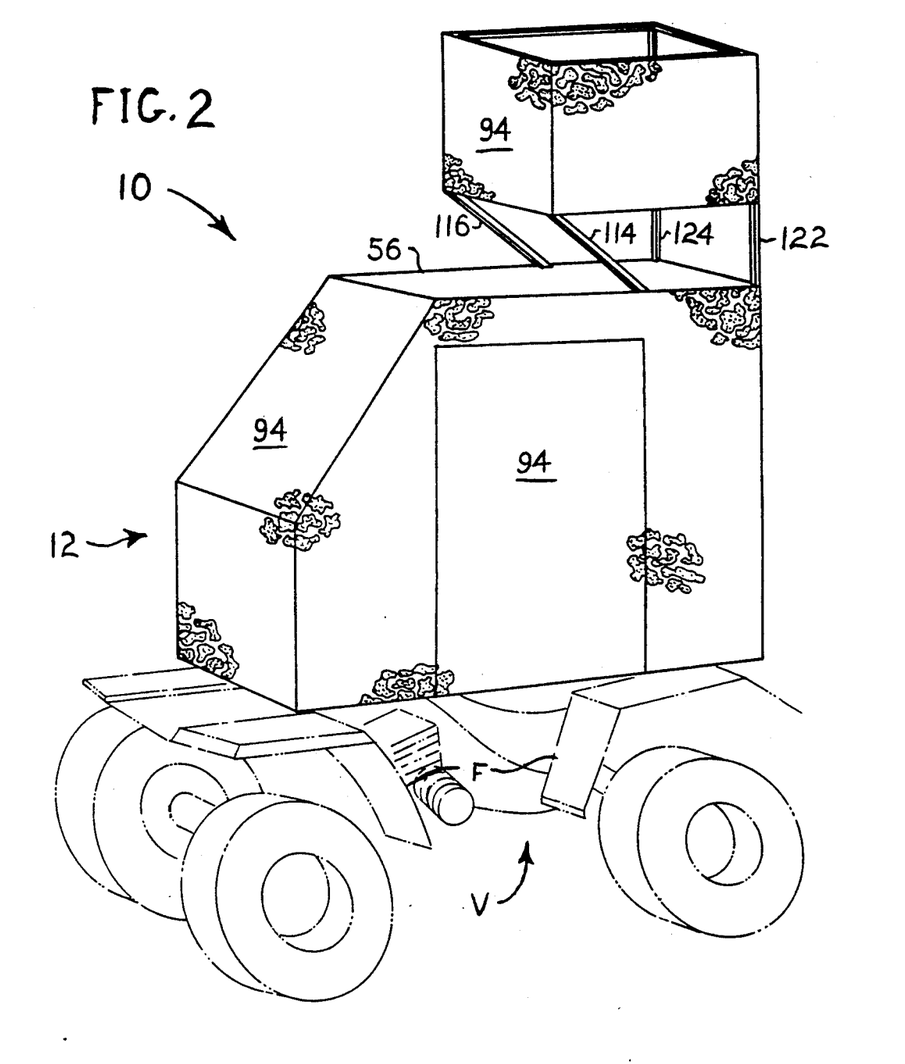
FIG. 2 is a perspective view of the erected cab and stand of FIG. 1, with camouflage covering installed.

Alternatively, the cab 12 and upper stand structure may be covered with camouflage material 94 when deployed in the field for hunting, as shown in FIG. 2. Obviously, when the metal and transparent panel structure of the cab 12 and other structure is covered with a generally opaque material such as the camouflage covering 94 of FIG. 2, the interior of the cab 12 will be relatively dark. It is also envisioned that the present invention may be transported on an ATV to a desired hunting or other site at dawn, dusk, or during hours of darkness, and accordingly, light means 96 is provided in the cab 12 interior adjacent to the hinged upper edge 86 of the windshield 84, as shown in FIG. 1. The light means 96 may be self contained with a collocated battery, or may be powered from the ATV V battery by means of appropriate wiring, if desired. Thus, the light means 96 provides illumination for consulting a map, cleaning or loading a hunting weapon, etc., in conditions of darkness and/or for a person within the cab 12 when camouflage material 94 has been installed thereon.

Figure 4:
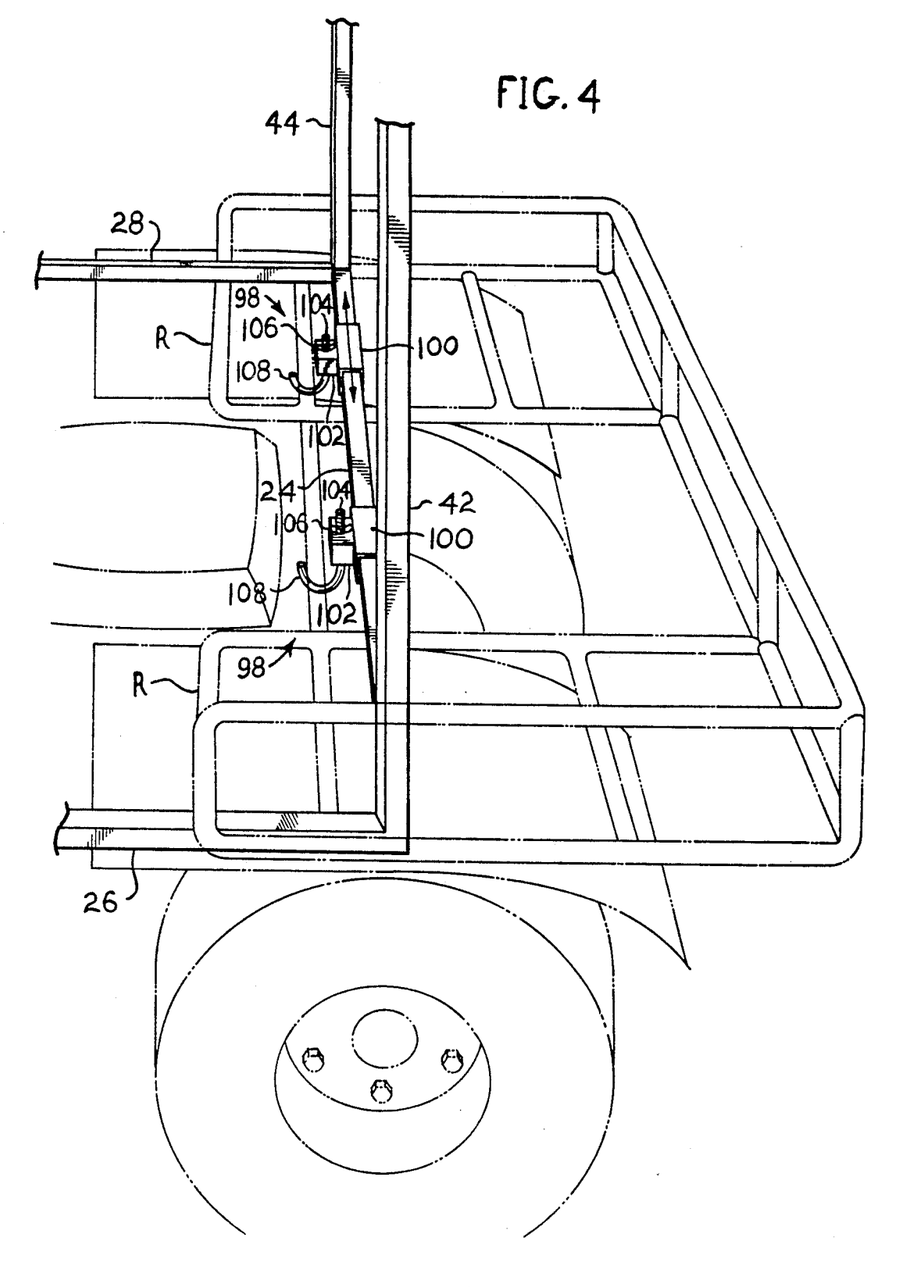
FIG. 4 is a broken perspective view showing details of the means for the attachment of the cab structure to the ATV.

The above described cab 12 is secured to an ATV V by means of a plurality of cab attachment latches 98, as shown in detail in FIG. 4. Latches 98 each include a sleeve 100 sized to closely fit over the outside of the lower forward and rear crossmembers 16 and 24. Each sleeve 100 includes a block 102 welded or otherwise secured thereto, with each of the blocks 102 having a substantially vertical hole therethrough and providing for the installation of a J-bolt 104 therein. The upper, threaded ends of the J-bolts 102 are secured through the latch blocks 102 by means of wing nuts 106 or other suitable means, with the lower, hooked ends 108 of the J-bolts 104 cooperating with the standard front and rear accessory racks R with which the typical ATV V is equipped. (FIG. 4 shows only the rear rack area of the ATV V. However, it will be seen that the latch arrangement shown in FIG. 4 is equally adaptable to the front rack of an ATV also.) The cab 12 is secured to the ATV V by loosening the fasteners 106 as required, and placing the cab 12 atop the ATV V, with the latches adjacent members of the front and rear racks R. The sleeves 100 provide for lateral adjustment of the position of the latches 98 as required, and it will be seen that the J-bolts 104 may be pivoted within the blocks 102 in order to attach to longitudinal rack members as well as lateral rack members, as appropriate. Once the cab 12 and the latches 98 are properly positioned, the fasteners 106 are tightened to draw up the J-bolts 104 through the cab attachment latch blocks 102, and clamp the rack members R between the hooked ends 108 of the J-bolts 104 and the overlying cab structure 12. The cab 12 may be removed easily by reversing the above operation.

The present invention also includes a foldable upper platform 110, a simplified version of which is shown in FIG. 1, with details of the construction and folding action shown in FIGS. 10 through 14. The support structure for the foldable upper platform 110 is preferably constructed in the same manner as the cab 12 structure, i.e., of welded square section steel tube. Again, alternative construction may be used if desired. The upper platform folding structure essentially comprises three folding components: (1) a front frame 112 including a left front member 114, a right front member 116, and a diagonal front cross brace 118 therebetween; (2) a rear frame 120 including a left rear member 122, a right rear member 124, and a diagonal rear brace 126; and (3) an upper platform floor 110, including front and rear lateral members 128 and 130, and a plurality of fore and aft horizontal platform members 132 therebetween. The foldable forward platform support frame 112 is pivotally secured to underlying left and right frame platform base frame members 134 and 136 (which members 134 and 136 are in turn secured to the underlying cab roof 56) respectively by brackets 138, while the rear platform support frame is pivotally secured to left and right rear platform base extension brackets 140 and 141 extending downwardly and rearwardly from the base frame members 134 and 136.

The upper platform 110 is folded by lifting the latch lever 142 (detail, FIG. 14) securing the platform in its erected position to release the capture slot 144 from the retaining pin 146 extending from the inner side of the left rear upper platform support member 122, to pivot the latch lever 142 upward about its pivot pin or bolt 148. The upper platform 110 is then pulled rearward. The upper platform 110 is somewhat longer than the rear platform support frame 120, hence the relatively lower pivot points 140 and 141 for the lower ends of the rear platform support frame 120. The forward platform support frame 112 will be seen to be approximately the same length as the rear platform support frame 120, but due to the higher attachment points 138 for its lower ends, the front frame 112 is angled somewhat forward when the platform 110 is erected. This causes the weight of the platform 110 and any weight thereon, to exert a forward as well as downward force component on the forward support frame 112, thus providing additional security for the erected platform 110 due to such "over center" action. Thus, some slight effort will be needed to supply the force required to produce the lifting action of the front of the platform 110, as the front support frame 112 initially lifts the front of the platform 110 as the frame 112 swings arcuately rearward, as shown in FIG. 11 of the drawings.

As the platform 110 is drawn further rearward, the shorter rear platform support frame 120 draws the rearward end of the upper platform 110 downward to retract against the rear structure of the cab 12, while the front platform support frame 112 folds flat against the roof 56 of the cab 12 and the upper platform 10 also lies against the back of the cab 12, adjacent to the rear platform support frame 120 in the completely folded state as shown in FIG. 12. Folding action for the upper platform 110 is provided by forward and rear upper platform pivotal attachment points 150 and 152, respectively securing the forward end of the upper platform 110 to the upper ends of the forward platform support frame 112 and the rear end of the upper platform 110 to the rear platform support frame 120.

The upper platform 110 also includes a pivotable and foldable chair 154, details of which are shown in FIGS. 10 through 13. The chair 154 is supported atop the upper platform 110 by a tripod arrangement comprising a single forward chair leg 156 and left and right rear chair legs 158 and 160, which legs 158 and 160 combine to provide a rear chair support 162. A diagonal cross brace 164 is connected between a first pivot point 166 on a platform crossmember 168 at the lower end of the forward leg 156, and a second pivot point 170 on a crossmember 172 extending between the two rear chair legs 158 and 160. The upper end of the front chair leg 156 is connected to the forward portion of a chair base 174 by a removable pin 176 or other quickly releasable means, in the same manner that the upper rear end of the diagonal cross brace 164 is connected to the upper rear chair support pivot point 170. The rear chair support 162 is pivotally secured to the fore and aft platform members 132 at a pivot 178, and at its opposite ends to the rearward portion of the chair base 174 at pivots 180. The chair base 174 also includes a pivot 182 (FIG. 10), allowing the chair 154 to rotate about a generally vertical axis for optimum seating of the user, in addition to providing support for the chair 154.

The chair support assembly is folded by removing or releasing the upper front pin or securing means 176 and the upper rear diagonal brace pin or securing means 170, and folding the front chair leg 156 and the diagonal brace 164 downward and rearward to rest adjacent the upper platform structure 110. The rear chair support frame 162 is then folded downward and forward to lie generally parallel to and adjacent to the upper platform 110, with the chair bottom 184 also folding downward and forward to lie parallel to and adjacent to the platform 110. The chair back 186 is pivotally attached to the chair bottom 184 at chair back pivots 188, thus allowing the chair back 186 to also lie generally parallel to the platform 110 when folded, for greater compactness.

Figure 5:
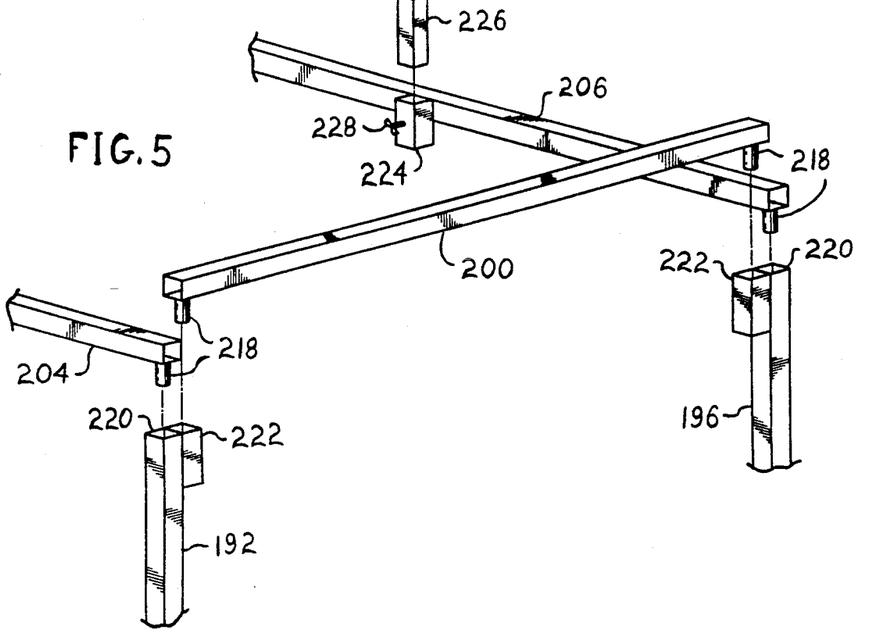
FIG. 5 is a broken perspective view showing the details of the upper guard rail assembly at the top of the stand.
Figure 15:
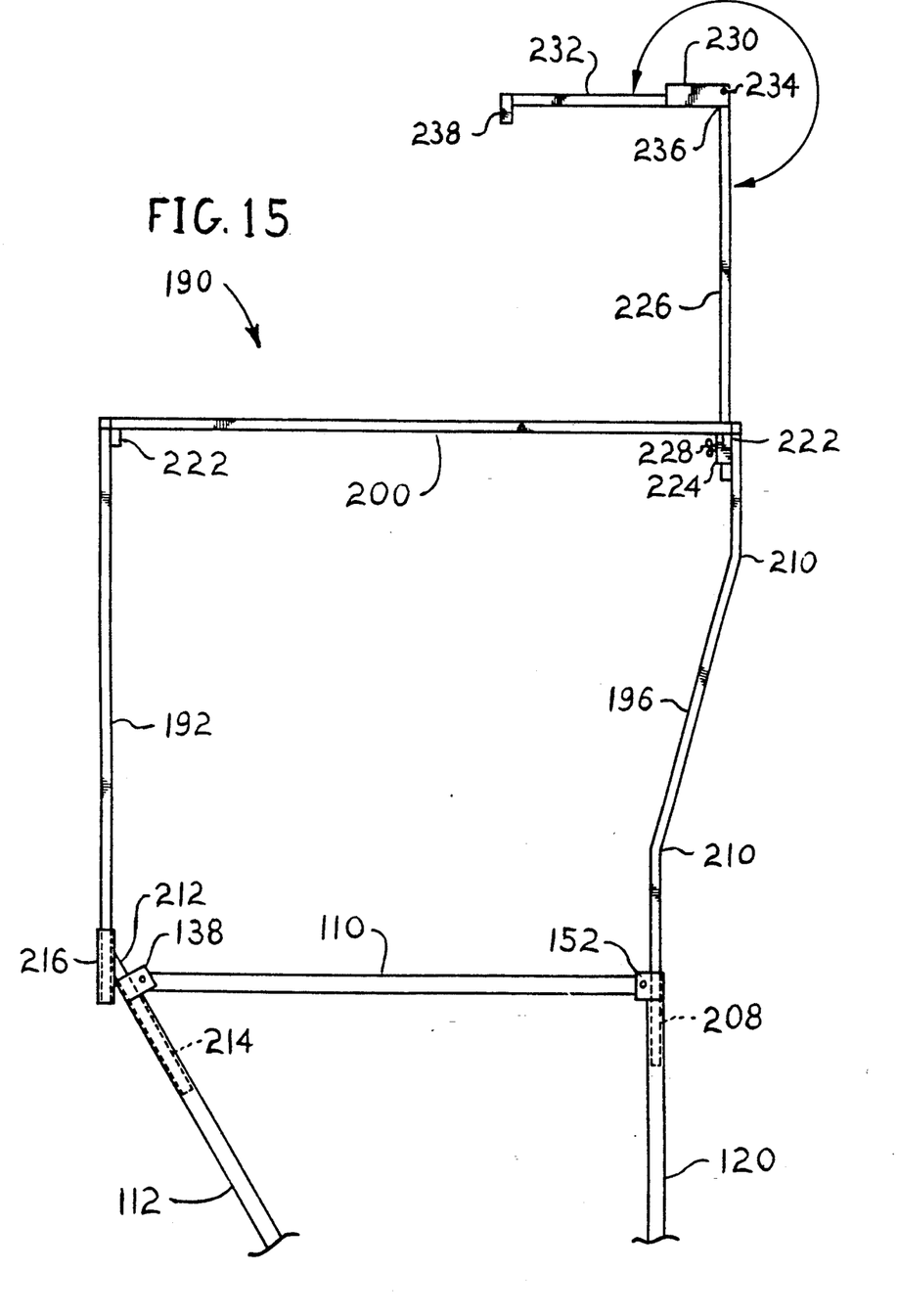
FIG. 15 is a simplified side view of the upper guard rail at the top of the stand, showing the attachment provision for an upper stand shade.

In order to provide safety for a person using the upper platform 110 and/or chair 154, a safety rail assembly 190 is also provided, which assembly 190 cooperates with the forward and rear upper platform support frames 112 and 120. FIG. 15 provides a side elevation view of the assembled safety rail 190, while FIG. 5 provides a perspective view of the assembly details. Safety rail 190 comprises left front, right front, left rear and right rear uprights 192, 194, 196 and 198, joined at the top by left and right side rails 200 and 202 and front and rear rails 204 and 206; right front and right rear uprights 194 and 198 and the right side rail 202 are shown in FIG. 1 of the drawings.

FIG. 15 shows the assembly of the left side upright members 192 and 196 with fittings provided and cooperating with the left front and left rear upper platform supports 112 and 120. The right side assembly is a mirror image of the left side assembly shown in FIG. 15 and discussed herein. As essentially the entire structure of the present invention is preferably formed of square section steel tube, the hollow tube interiors provide sockets for the insertion of smaller size tubes. In this manner, the lower ends 208 of the left and right rear uprights 196 and 198 are inserted into the upper ends of the left and right rear uprights 122 and 124 which support the upper platform 110. Stop means, not shown (e.g., a pin through the platform support uprights 122 and 124, or a collar on the rear safety rail uprights 196 and 198) may be included to provide the proper insertion depth for the safety rail uprights. In addition, the rear safety rail uprights may include opposite outward bends 210 in order to provide somewhat more room at the height of the rail itself. The front safety rail uprights 192 and 194 are secured to the left and right front upper platform supports 114 and 116 by means of identical left and right fittings 212, comprising relatively smaller lower end sections of tubing 214 which insert into the upper ends of supports 114 and 116, and upper sections of tubing 216 which provide for the insertion of the left and right forward safety rail uprights 192 and 194 therein. Again, stop means, not shown, may be provided to limit the depth of insertion of the left and right forward safety rail uprights 192 and 194 into the upper sections 216 of the fittings 212. The upper tubing sections 216 of the fittings 212 will be seen to be secured (e.g., welded) to the lower tubing sections 214 at an angle equal to that of the upper platform forward support members 114 and 116, to provide for the vertical installation of the forward safety rail uprights 192 and 194.

Each end of each of the four safety rails 200 through 206 include pins 218 which insert into the upper ends 220 of the uprights 192 through 198 or adjacent sockets 222, as shown in FIG. 5. A total of eight pins 218 are thus provided, four of which are shown. The upper ends of each of the four safety rail uprights 192 through 198 includes a second socket 222, which with the open upper ends 220 of each of the uprights 192 through 198, provide a total of eight receptacles for the eight pins 218 of the rail members 200 through 206. Thus, as with the rest of the structure of the present invention, the various safety rail components 192 through 222 may be easily and quickly assembled without the need of any tools, which assembly provides significant advantages in the field.

FIGS. 5 and 15 disclose further details providing additional shelter for a person using the upper platform 110 of the present invention. A generally vertical socket 224 is provided along one of the safety rails (preferably along the rear rail 206), which socket provides for the insertion of a mast 226; the lower end of the mast 226 may be secured within the socket by a thumb screw 228 or other suitable means. The mast 226 includes a bracket 230 at the upper end, which has a folding mast extension 232 extending therefrom and which is secured to the upper end of the mast 226 by means of an offset pivot 234. The offset of the mast extension 232 relative to the mast 226 will be seen to allow the mast extension 232 to lie immediately adjacent the mast 226, when the extension 232 is folded. However, the offset of the pivotable bracket 230 will also be seen to include a lower extension end 236, which engages with the side of the mast 226 upper end to provide a stop means when the mast extension 232 is unfolded, thus placing the mast extension 232 in a substantially horizontal position and placing the distal end of the extension approximately over the center of the upper platform 110. The distal end of the extension includes a socket 238 which is substantially vertical when the extension 232 is deployed, and which socket 238 provides for the insertion therein of shelter means (not shown; e.g., umbrella, parasol, or other means of providing shade). Thus, a hunter or other user of the present invention may enjoy shade or at least limited shelter from the elements, while at the same time enjoying the height advantage provided by the upper platform 110 and chair 154.

Figure 7:
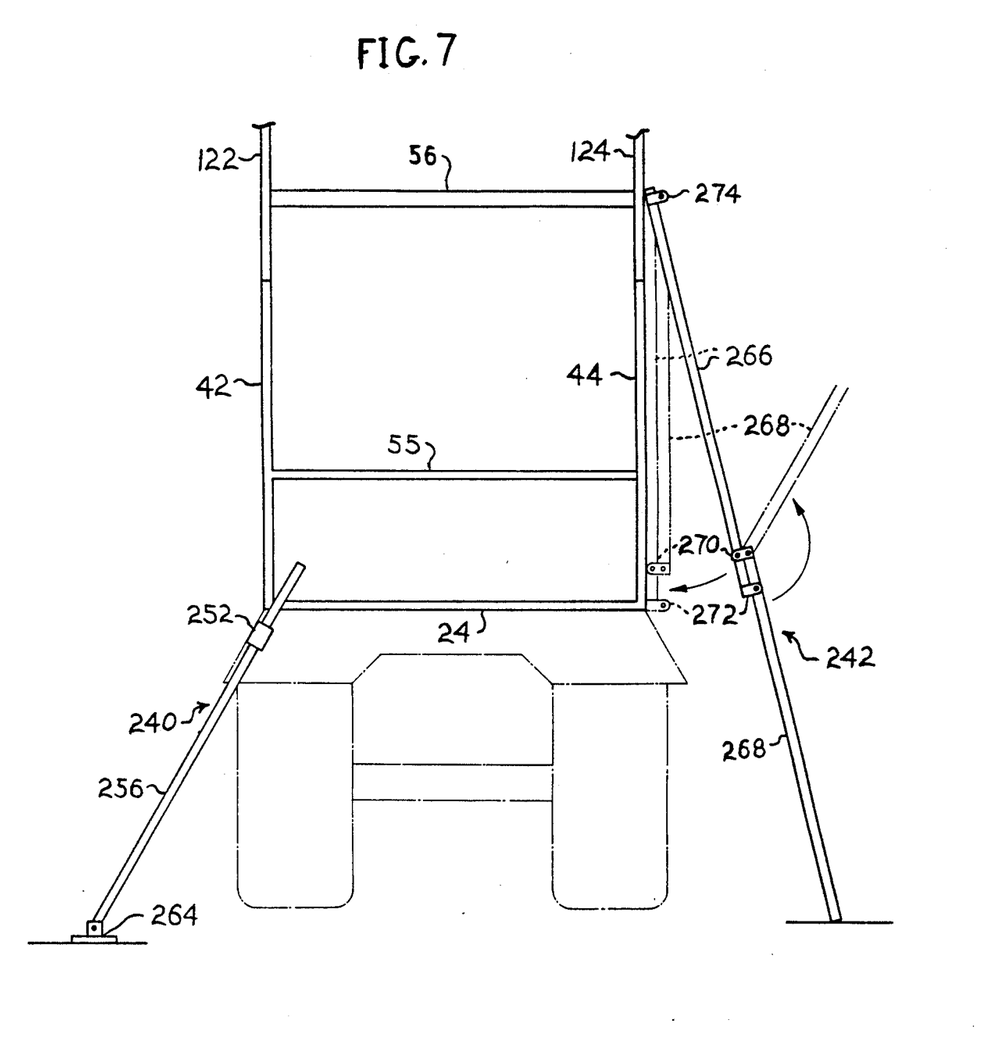
FIG. 7 is a rear view showing the lateral bracing and stand access ladder deployment.
Figures 8, 9:
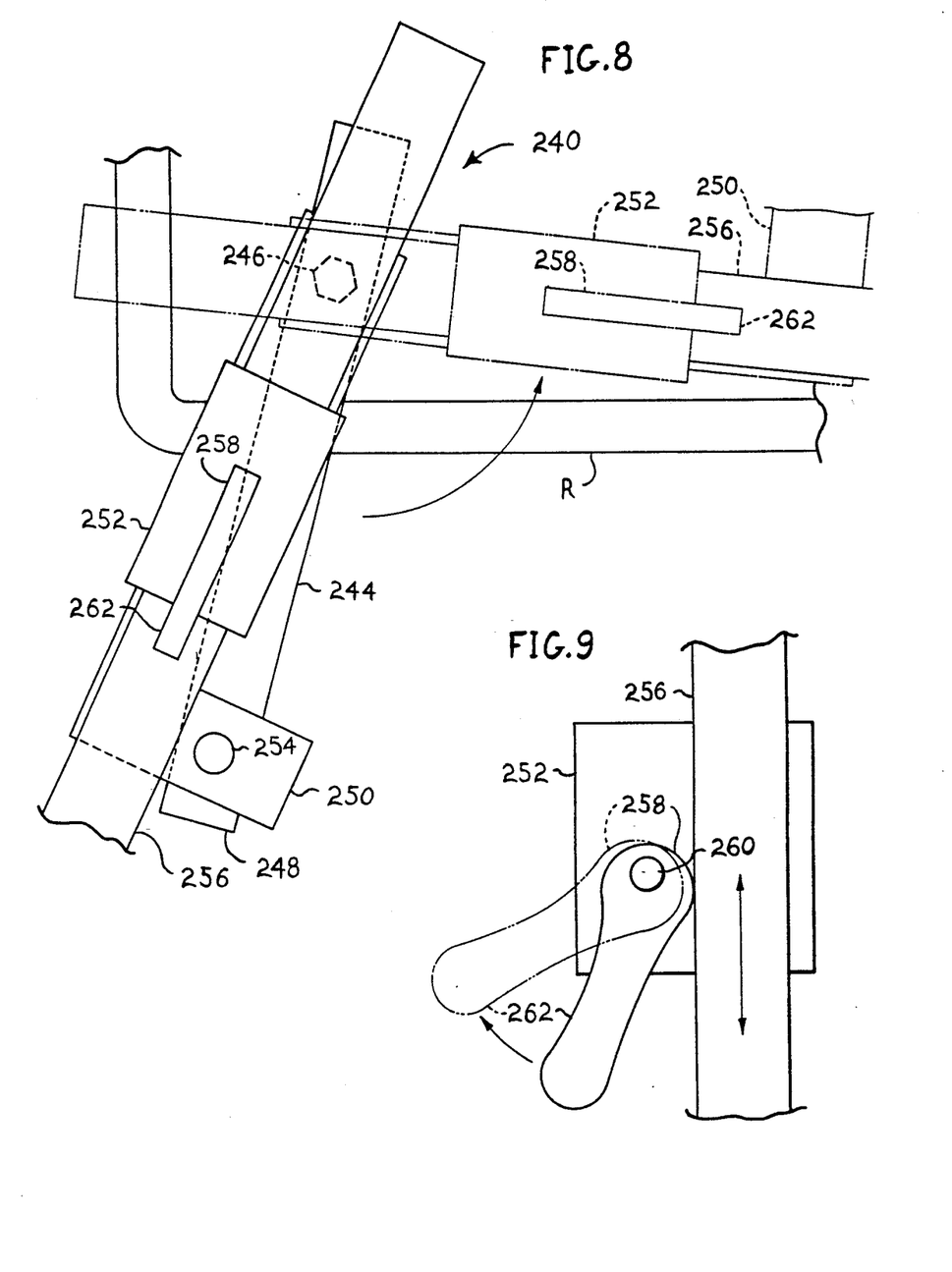
FIG. 8 is a broken rear view showing the folding mechanism for the lateral brace.
FIG. 9 is a broken detail side view of the locking means for the lateral brace.
Figure 10:
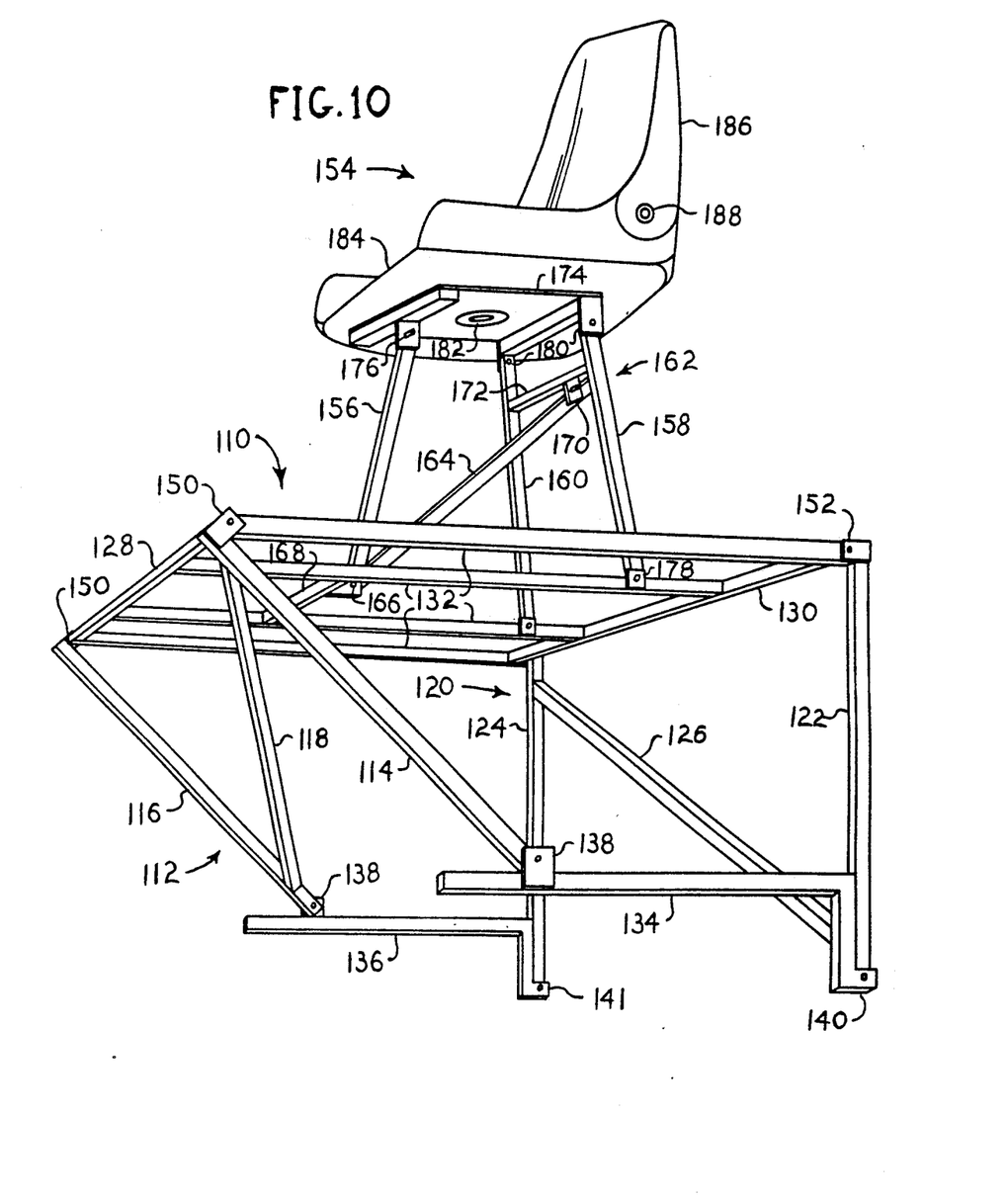
FIG. 10 is a perspective view of the erected upper stand, including the seat thereon.

In consideration of the substantial height of the upper platform 110 and chair 154 when the present invention is fully erected, in addition to the mass of a person thereon and any equipment on the upper platform 110, it will be seen that the cab and stand 10 will have a relatively high center of gravity, particularly as a result of its installation atop an ATV V. Moreover, access to the upper platform 110 and chair 154 will be seen to require some climbing. Accordingly, lateral bracing means comprising a lower brace 240 and an opposite combination brace and ladder 242 are provided. (While FIG. 7 shows the lower brace 240 on the left side of the cab 12 and the ladder/brace 242 on the right side, it will be understood that these two components may be installed on opposite sides from those shown, if desired.) The lower brace 240 is preferably secured to the rear rack R of the ATV V, as shown in the detail of FIG. 8. A brace attachment bracket 244 is bolted, clamped or otherwise secured to at least one rack member R, and provides for the pivotal attachment of the lower brace 240 to the rack R by means of bolt or pivot 246. (The pivot bolt 246 is positioned behind the brace 240 upper end in FIG. 8.) The brace attachment bracket 244 includes an extension 248, which cooperates with an ear 250 of the brace extension lock 252 in order to lock the lower brace 240 at the desired outward and downward angle. Mating holes 254 are provided through the bracket extension 248 and the brace extension lock ear 250, which holes 254 provide for a locking pin (not shown) to be inserted therethrough to lock the brace 240 at the desired angle.

Due to uneven terrain, different loads, etc., it may be necessary to extend the lower brace leg 256 to a different length at various times. The brace extension lock 252 provides for this; a side view in section of the brace extension lock 252 is shown in FIG. 9. Extension lock 252 essentially comprises a sleeve through which the brace leg 256 may slide or pass. The extension lock 252 further includes a cam 258, which operates by means of an eccentric pivot 260. The lower or rack brace 240 is operated by lowering the brace 240 from its stowed position and securing it in an outward and downward angle by means of the locking extension and ear 248 and 250 as shown in FIG. 8, raising the cam handle 262 to loosen the cam 258, sliding the brace leg 256 to the desired position, and locking the cam 258 against the brace leg 256. For greater stability on soft surfaces, a pivotable, self leveling pad 264 having a relatively large area is provided at the distal end of the brace leg 256. The procedure is reversed to raise and stow the rack brace 240.

FIG. 7 also provides details of the combination brace and ladder 242, used to brace the opposite side of the cab and stand 10 from the lower or rack brace 240. The brace/ladder 242 comprises an upper section 266 and a lower section 268, joined by two hinges 270 at each side (only one of which is shown in the side view of the ladder in FIG. 7). The hinges 270 provide an offset between the upper section 266 and the lower section 268 of the ladder 242, in order that the lower section 268 may be folded parallel to and adjacent to the upper section 266 for storage, as shown in FIG. 7. A locking tab 272 extends outward from the lower end of the upper section 266, and serves to secure the upper and lower sections 266 and 268 in a rigid assembly when extended, by means of pins (not shown) inserted through mating, aligned holes in the locking tab 272 and near the upper end of the lower section 268 of the ladder 242. A pivotable ladder attachment hinge 274 secures the upper end of the ladder upper section 266 to the upper portion of the cab 12, adjacent the cab roof 56.

In accordance with the structure of the present invention described above, the ATV cab and stand 10 may be quickly and easily installed upon an ATV by placing the cab and stand assembly on the ATV with the forward and rear bases 14 and 22 resting respectively upon the forward and rear racks R of the ATV V, and the cab attachment assembly shown in FIG. 4 used to secure the cab and stand 10 to the ATV V. The only other connection which might be necessary is an electrical connection for the cab interior light 96, in the event that the electrical source of the ATV is used, rather than a self contained battery for the light 96. The ATV V may then be driven or transported to the desired hunting or other site and the various elements deployed for use. In the event of relatively warm conditions, the doors 58 and 60 may be easily and quickly removed by opening the door handles and latches 78 and 80, swinging the doors 58 and 60 open so that their upper edges clear the overlying frame member or lintel 50, and lifting the door hinge pins 74 from their corresponding hinge blocks 64; the front windshield 84 may also be opened for further ventilation as desired. The upper platform 110, chair 154, and safety rail 190 may then be erected, as described in detail above, and the lower brace 240 extending from the rear rack R of the ATV V and the opposite side combination ladder and brace 242 may be extended to provide stability and access to the upper platform 110. The transparent covering 92 provided for the cab portion 12 of the present invention provides excellent visibility for any cab occupant(s), or alternatively, camouflage material 94 may be installed over the outer surface of both the cab 12 and the overlying upper platform 110 and safety rail 190, if desired. The resulting structure may be quickly and easily assembled without resort to any hand or other tools or equipment, thus providing great convenience in the field. When hunting or other activities are over, the erection procedure for the upper platform, safety rail, braces etc. may be easily and quickly reversed, with the folding and self contained nature of the present invention providing for carriage of the entire assembly aboard the ATV V. The present invention provides excellent visibility and comfort for hunting or other outdoor activities (e.g., game photography, bird watching, etc.) and can prove of great value in other activities, such as providing a shelter and observation point for sports officials for motocross and/or off road racing activities, etc. The versatility and utility of the present invention will be seen to extend to a wide range of fields and activities.

It is to be understood that the present invention is not limited to the sole embodiment described above, but encompasses any and all embodiments within the scope of the following claims.

I claim:

1. A portable, quickly and easily installable and removable cab for temporary installation upon a lightweight, open all terrain vehicle, with said all terrain vehicle including front and rear racks rigidly and permanently affixed thereto, said cab comprising:

a rigid, permanently assembled monolithic structure comprising a front portion and a rear portion having left side and right side openings therebetween and having a common roof extending across said front portion, said rear portion and said left and right side openings;

said front portion and said rear portion respectively cooperating with said front and rear racks of said all terrain vehicle and defining an enclosure along with said common roof, with said openings providing left side and right side access to said enclosure, whereby;

said cab is temporarily secured to said front and rear racks of said all terrain vehicle to provide enclosed shelter for an operator of said all terrain vehicle;

said cab including left and right doors hingedly attached to said front portion of said cab and latchable to said front portion of said cab and latchable to said rear portion of said cab, whereby;

said left and right openings between said front portion and said rear portion of said cab are closable.

2. The cab of claim 1 including:

means providing for the temporary and secure attachment of said front portion and said rear portion of said cab respectively to the front rack and to the rear rack of the all terrain vehicle.

3. The cab of claim 1 including:

interior illumination means installed within said cab enclosure.

4. The cab of claim 1 wherein:

said left and right doors are removably installable upon said cab.

5. The cab of claim 1 wherein:

said front portion of said cab includes windshield means.

6. The cab of claim 5 wherein:

said windshield means is hingedly openable and closable.

7. The cab of claim 1 wherein:

at least said front portion and said rear portion of said cab are covered with transparent sheet material.

8. The cab of claim 7 wherein:

said transparent sheet material comprises acrylic plastic sheet.

9. The cab of claim 1 wherein:

said cab is covered with camouflage material.

10. A portable, quickly and easily installable and removable cab for temporary installation upon a lightweight, open all terrain vehicle, with said all terrain vehicle including front and rear racks rigidly and permanently affixed thereto, said cab comprising:

a rigid, permanently assembled monolithic structure comprising a front portion and a rear portion having left side and right side openings therebetween and having a common roof extending across said front portion, said rear portion and said left and right side openings;

said front portion and said rear portion respectively cooperating with said front and rear racks of said all terrain vehicle and defining an enclosure along with said common roof, with said openings providing left side and right side access to said enclosure, whereby;

said cab is temporarily secured to said front and rear racks of said all terrain vehicle to provide enclosed shelter for an operator of said all terrain vehicle;

said cab including upper stand means installed upon said roof of said cab; and wherein:

said upper stand means includes a safety rail temporarily installable thereon.

11. The cab of claim 10 wherein:

said upper stand means is covered with camouflage material.

12. The cab of claim 10 wherein:
said upper stand means is collapsible and foldable against said cab.

13. The cab of claim 10 wherein:
said upper stand means includes a pivotable chair installed thereon.

14. The cab of claim 10 wherein:
said upper stand means is formed of rectangular section steel tubing.

15. A portable, quickly and easily installable and removable cab for temporary installation upon a lightweight, open all terrain vehicle, with said all terrain vehicle including front and rear racks rigidly and permanently affixed thereto, said cab comprising:

a rigid, permanently assembled monolithic structure comprising a front portion and a rear portion having left side and right side openings therebetween and having a common roof extending across said front portion, said rear portion and said left and right side openings;

said front portion and said rear portion, respectively, cooperating with said front and rear racks of said all terrain vehicle and defining an enclosure along with said common roof, with said openings providing left side and right side access to said enclosure, whereby;

said cab is temporarily secured to said front and rear racks of said all terrain vehicle to provide enclosed shelter for an operator of said all terrain vehicle;

said cab including a foldable ladder secured to and movably extendible from said cab, whereby said ladder further serves as a brace means providing for the lateral bracing of said cab upon said all terrain vehicle.

16. The cab of claim 1 wherein:
said cab is formed of rectangular section steel tubing.

* * * * *